DATA STORAGE TIMING SYSTEM

Filed Aug. 24, 1961 4 Sheets-Sheet 1

INVENTOR.
HAL K. ST. CLAIR
BY Walter J. Madden, Jr.
ATTORNEY

DATA STORAGE TIMING SYSTEM

July 13, 1965 H. K. ST. CLAIR 3,195,118

DATA STORAGE TIMING SYSTEM

Filed Aug. 24, 1961 4 Sheets-Sheet 4

United States Patent Office 3,195,118
Patented July 13, 1965

3,195,118

DATA STORAGE TIMING SYSTEM

Hal K. St. Clair, Los Gatos, Calif., assignor to International Business Machines Corporation, New York, N.Y., a corporation of New York Filed Aug. 24, 1961, Ser. No. 133,719
9 Claims. (Cl. 340—174.1)

Figures 1, 1A, 1B:
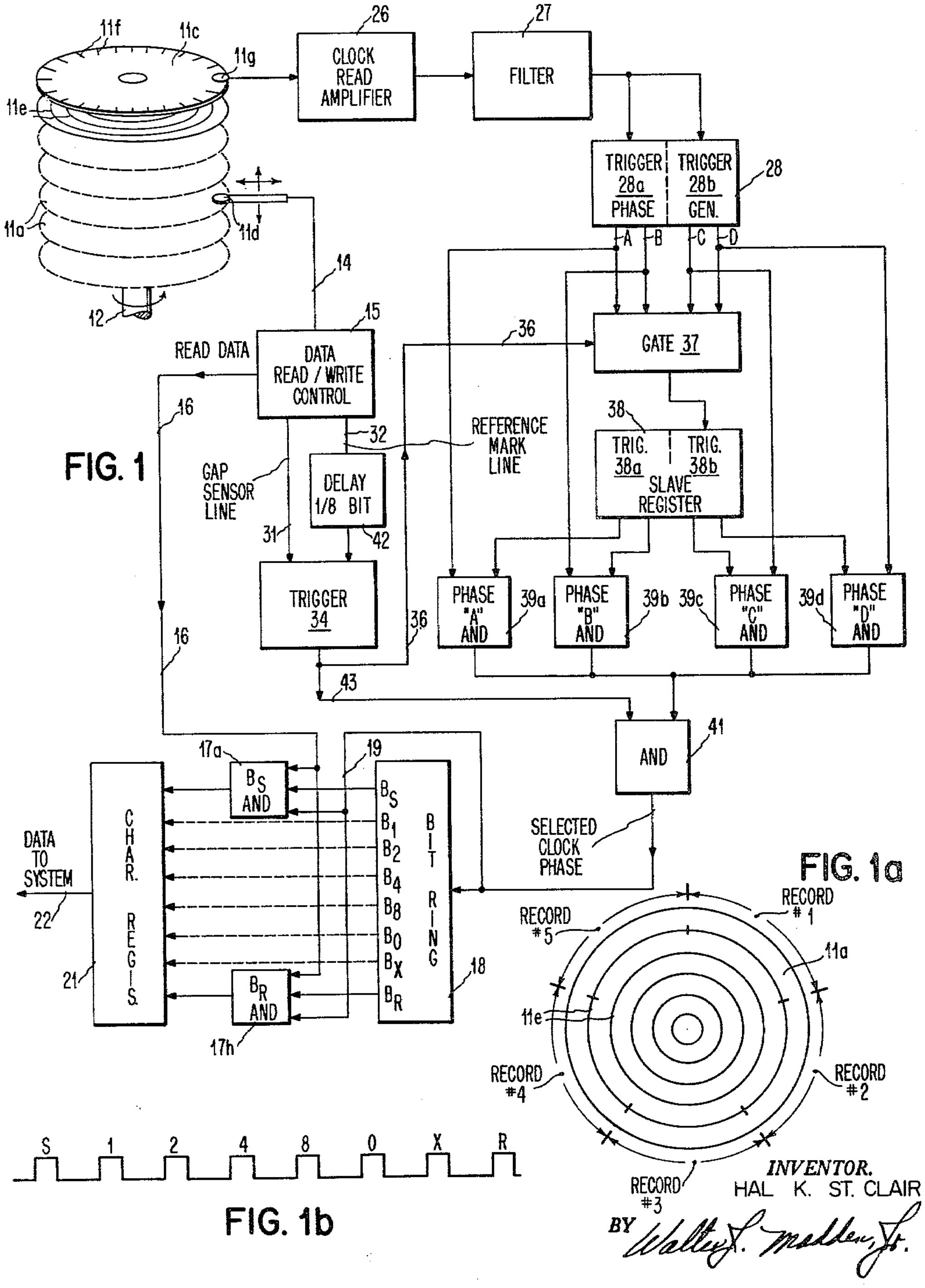

The invention relates in general to timing systems and relates more particularly to systems for timing the flow of data to and from a rotating magnetic data storage file.

The use of rotating magnetic files of the disk type is becoming increasingly common for the storage of data in data processing systems. Most of such files utilize a plurality of disks rotating on a common spindle, with one or more movable transducers provided for cooperating with the different disk surfaces. It is common practice in rotating storage files to utilize a so-called clock track therein to control the timing of the flow of data to and from the file. This clock track comprises a plurality of equally spaced magnetic pulses disposed in a circular track on one disk surface. A fixed transducer senses these clock pulses as the disk assembly rotates, and the output pulses from the clock transducer are utilized to gate the flow of information data to and from the disks. Such a clock track generally has a frequency at least equal to the bit frequency utilized in the data tracks so that there is at least one clock pulse for each possible bit position. Such a system works satisfactorily where the data transducers are fixed relative to the data tracks so that there is reasonable assurance that the transducer remains in more or less precise registry with its associated data track. However, where one or more movable transducers are utilized for cooperating with different data tracks in the disk file, the mechanical problems encountered in obtaining exact registry on successive positionings of a transducer to a given data track become quite complicated, so that on such successive positionings, differences in registration of the transducer relative to the track may introduce errors in the data clocking.

Broadly, the present invention contemplates a timing system for timing the flow of data to and from a rotating file utilizing a clock track having at least one clock pulse per bit time thereon. The clock pulse or pulses for each bit period are divided into four clock phases, each of these phases being spaced 90° apart during a single bit period. These four clock phases per bit period are fed to a selection network which selects that clock phase from among the four available clock phases which is closest to the actual location of the data bits, and utilizes this selected phase to clock the data in that portion of the record. In accordance with a prominent feature of this invention, the clock phase selection circuitry is operative to rephase the clock with the data at suitable intervals during a complete disk revolution. The particular intervals at which the rephasing occurs will depend upon the nature of the particular application and the amount of difficulty experienced in maintaining the clock in phase with the data bits, but as a general rule, the rephasing will occur at least once per revolution of the disk and preferably occurs a number of times during each disk revolution.

It is therefore an object of the present invention to provide improved apparatus for controlling the flow of data to and from a rotating storage device.

It is a further object of the present invention to provide apparatus for controlling the timing of data to and from a cyclic file in which a source of clock pulses synchronized with the cyclic file for controlling such timing is rephased relative to the data at intervals during a cycle to maintain synchronization between the clock pulses and the data.

It is a further object of the present invention to provide apparatus for timing the flow of data to and from a cyclic recording medium in which a plurality of trains of clock pulses are generated and one of these trains is selected to control the timing of the data flow.

Figure 2:
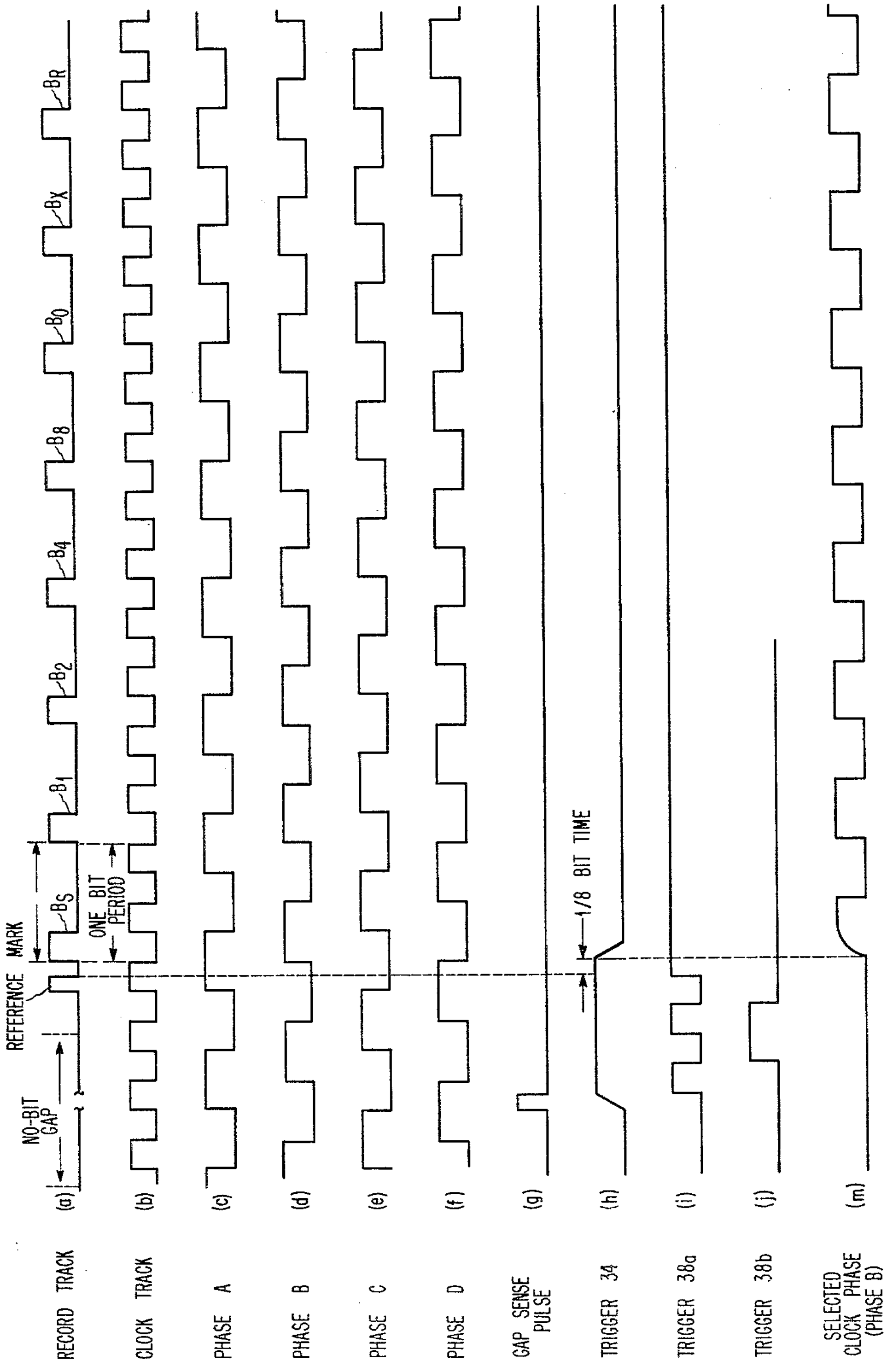
Figure 3:
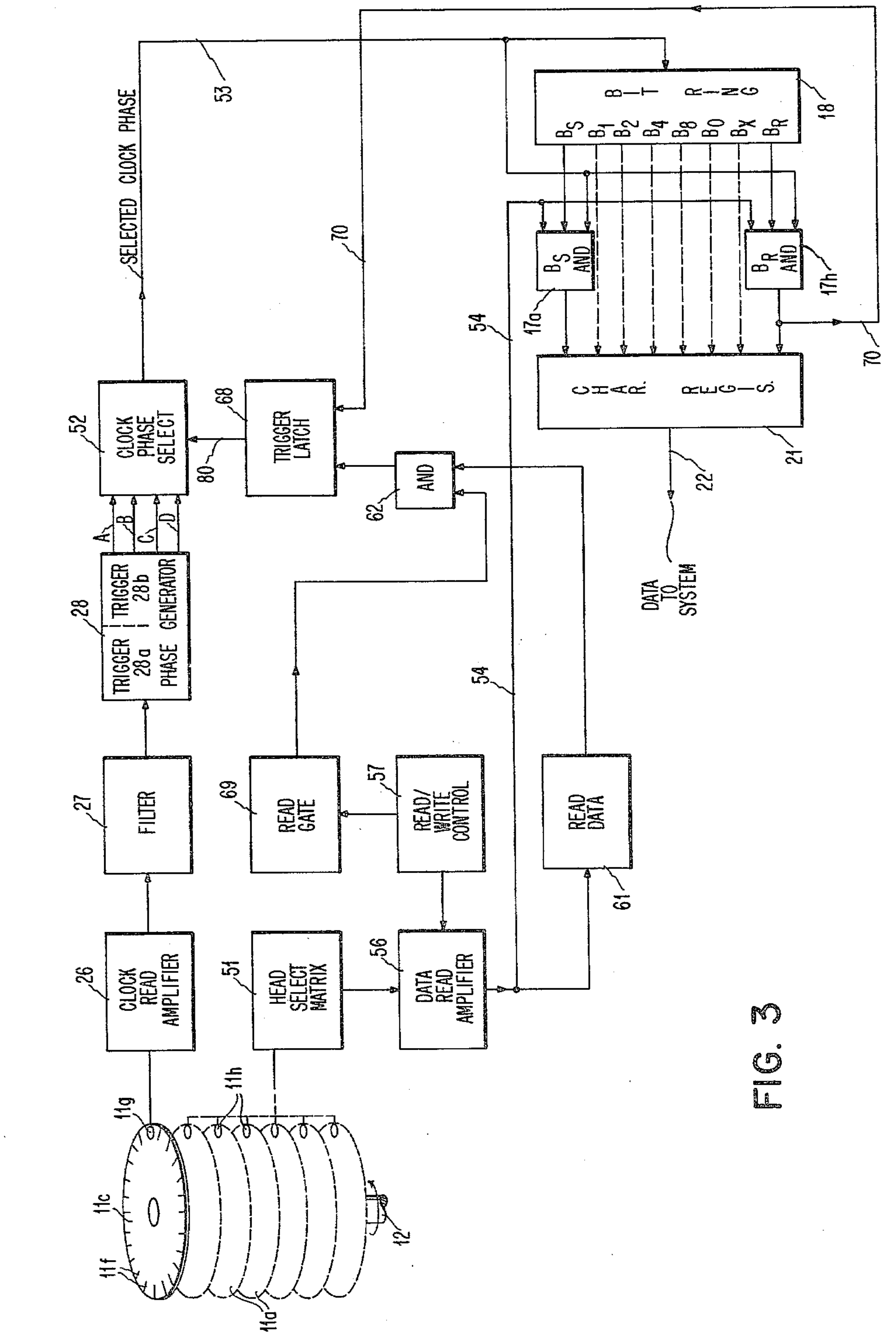
Figure 4:
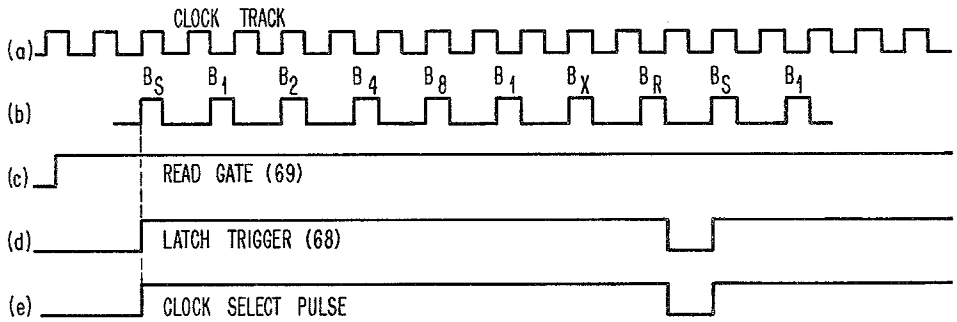
Figure 5:
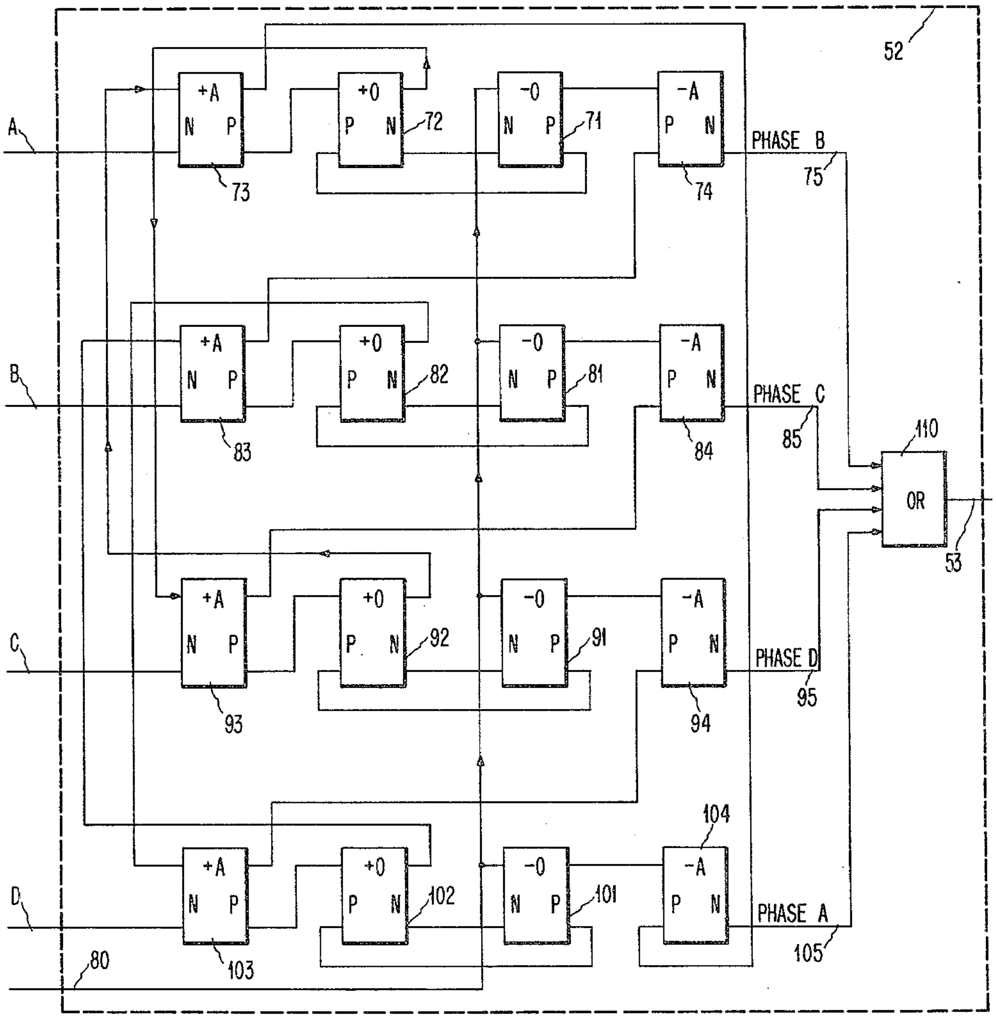

Objects and advantages other than those set forth above will be apparent from the following description when read in connection with the accompanying drawing, in which:

FIG. 1 schematically illustrates one embodiment of the present invention in which the clock is rephased with the data at the beginning of each record;

FIGS. 1*a* and 1*b* illustrate the binary code utilized and the arrangement of records on a data disk surface;

FIG. 2 is a series of graphs illustrating the relationships among signals in different portions of the circuit of FIG. 1;

FIG. 3 schematically illustrates an alternate embodiment of the invention in which the rephasing occurs once per character;

FIG. 4 is a series of graphs illustrating the operation of the circuitry of FIG. 3; and FIG. 5 schematically illustrates the clock phase selection logic of the embodiment of FIG. 3.

Referring to FIG. 1 by character of reference, the invention is illustrated in connection with timing the flow of data from a disk file having a plurality of information or data disks 11*a* together with a clock disk 11*c*. All of the disks are mounted on a common shaft 12 which is rotated by a suitable motive power source (not shown) to carry the record surfaces of the data disks past an associated transducer 11*d* which is selectively positionable in two directions to magnetically cooperate with different ones of the record surfaces. In the preferred embodiment of the invention, each information disk 11*a* is provided with a magnetizable coating on its top and bottom surfaces, and each such magnetizable surface is provided with a plurality of concentric circular recording tracks 11*e* progressing outwardly from the disk center. Each such track in turn may be divided into one or more records as shown in FIG. 1*a*, the exact number of records in a given track depending upon the particular format utilized. In FIG. 1*a* the outermost data track 11*e* on disk surface 11*a* contains five different records.

Each of the different records within a track, in turn, is composed of a plurality of characters representing in binary form the alphanumeric characters making up the record information. Each character in turn is composed of a plurality of binary bits, the exact number of bits in each character depending upon the particular code utilized. In FIG. 1*b*, there is shown graphically a code which is considerable use in data processing and which will be assumed to be the code utilized in the present invention. As shown in FIG. 1*b*, the code includes information bearing bits "1," "2," "4," "8," "0," "X," a redundancy or parity check bit "R," and a space bit "S" preceding the other bits in the character. As is well known in the art, the space bit is utilized to indicate the start of the character, while the redundancy bit is used for parity checking. The remaining bits are utilized in different combinations to represent the different alphanumeric characters to be recorded.

In the present invention, it is assumed that a modified NRZI method of recording is utilized in which a binary "1" is represented by a change in the direction of magnetization of the magnetizable material, while a binary "0" is represented by no change in the direction of magnetization. In the code indicated in FIG. 1*b*, the presence of a bit at each of the different bit positions is indicated by a change of direction of magnization of the magnetizable material, while the lack of a bit at any given bit position is represented by a lack of change of the direction of magnetization from the direction of the preceding bit position.

To read out data recorded in accordance with the system described, it is necessary to determine, for each bit position, whether or not there is a change of direction of magnetization of the magnetizable record material at that bit position. To accomplish this determination, the output of transducer 11*d* is sampled once per bit time to determine whether a change of magnetic state occurred during that bit time. The sampling is done under the control of the clock track and includes supplying the output from transducer 11*d* continuously during reading over a conductor 14 to a device 15 labelled "data read/write control." It will be understood that device 15 includes the read amplifier and write driver circuitry conventionally associated with transducers, together with means for controlling which of the two operations is to take place. This read signal from transducer 11*d* is supplied from device 15 on a conductor 16 as one input to each of eight AND gates (of which only AND gates 17*a* and 17*h* are illustrated) which also receive inputs from the selected clock phase and from a bit ring 18.

Bit ring 18 has as many different output lines as there are bits in the code being utilized. In the embodiment of FIG. 1, bit ring 18 has eight different output conductors, each of which represents one of the bits $B_s$, $B_1$, $B_2$ $B_4$, $B_8$, $B_0$, $B_x$, and $B_r$ making up a character in the code. The bit ring is synchronized so that the output conductor for a given bit has a predetermined condition during the time within which that given bit should occur if a bit is present. In other words, the bit ring provides an output for each bit during the entire time within which that bit should or could occur, and this output from the bit ring is supplied as one input to the associated AND gate to which is also supplied the selected clock phase and the read data from transducer 11*d*.

In FIG. 1, AND gate 17*a* corresponds to the space bit S and receives as one input the $B_s$ output from bit ring 18. AND gate 17*a* also receives one input from a conductor 19 in the form of the selected clock phase pulse (as will be described more in detail below), and also receives a third input through conductor 16 from the data read device 15 representing data read by transducer 11*d*. Thus, when signals appear simultaneously on conductors 16 and 19 and from the $B_s$ output line of bit ring 18, AND gate 17*a* is opened to supply a pulse therethrough. Although only gate 17*a* for the space bit and gate 17*h* for the redunancy bit are illustrated, it will be understood that there is a similar AND gate for each of the other bits $B_1$, $B_2$, $B_4$, $B_8$, $B_x$, $B_0$ in the code and that each of these AND gates receives inputs from conductors 16 and 19 and from the associated output line of bit ring 18. It will be understood that the input from the read data line 16 and the input from the selected clock phase line 19 are common to all of the AND gates 17, and that it is the individual outputs from bit ring 18 which The outputs from the AND gates 17*a* . . . 17*h* are connected as separate inputs to a character register 21 in which the different bits are stored and decoded to determine the particular character represented by the bits. As is well known in the art, character register 21 has an input connection for each of the different bits making up the code, and is operative to store the bits received serially and to provide an output signal over an output conductor 22 indicating the character represented by those bits. The bits are clocked serially into character register 21, starting with the $B_s$ bit and progressing through the bits to the $B_r$ bit.

With the above description of the general method of clocking data out of the disk file, the operation of the present invention for reselecting a clock phase pulse to perform this data clocking will be described. As indicated above, the disk file contains a separate disk 11*c* having thereon a clock track in the form of uniformly spaced magnetic pulses 11*f* around the periphery thereof. In the embodiment of FIG. 1, it is assumed that these clock pulses have a frequency twice that of the bit frequency, as shown in the graph of FIG. 2*b*. Clock pulses 11*f* are read from the rotating clock disk 11*c* by a fixed clock head or transducer 11*g* which supplies its output to a clock read amplifier 26. The output pulses from read amplifier 26 are smoothed in a filter network 27 and then supplied in parallel to the two inputs of a phase generator 28. Phase generator 28 comprises a pair of triggers 28*a*, 28*b*, each of which has two output conductors.

The common input to triggers 28*a*, 28*b* will be a pulse train having a frequency double that of the bit frequency, and triggers 28*a*, 28*b* are operative to generate from this pulse train four separate pulse trains, each of which is shifted 90° from the adjacent pulse train. Thus, the output from phase generator 28 is four separate pulse trains appearing at output lines A, B, C, D, each of these output pulse trains being shifted 90° with respect to the adjacent pulse train. These output pulse trains are illustrated in graphs 2*c*, 2*d*, 2*e* and 2*f*, showing the 90° phase shift in the pulse trains within one bit period. The present invention includes the selection of one of these four pulse trains or clock phases for use in clocking the data to and from the disk file, and the reselection of one of these phases at a suitable interval.

In the embodiment illustrated in FIG. 1, it has been assumed that the clock is to be rephased every record, and assuming five records per track, this indicates five reselections per disk revolution. Each of the records on each track on the disk file has a format as shown in FIG. 2*a*. This format includes a gap at the beginning of the record in which there are no bits present. This gap may be of any suitable length, such as a length corresponding to eighty bits, so that the gap may be sensed by suitable means which are responsive to the absence of bits for a predetermined length of time. It will be understood that this gap sensing equipment is included in the data read-write control device 15 and is operative to sense a gap having a length corresponding to the selected gap length and to produce an output signal on a gap sensing conductor 31 after sensing this gap as illustrated in FIG. 2*g*.

Following the gap at the start of the record is a permanent reference mark (FIG. 2*a*) which may be magnetically recorded on the track in a manner similar to a binary "1." This reference mark, once placed on the record, is not subject to erasure or rewriting except when the entire record is to be obliterated. This reference mark is sensed by means conditioned by the gap sensor to produce an output pulse on a reference mark conductor 32. Following the reference mark, the regular binary bits forming the different characters in the record data appear in the normal manner.

The gap mark pulse on conductor 31 is supplied as one input to a trigger 34 which controls the selection of the desired clock phase pulse. When the gap mark of FIG. 2*g* occurs on conductor 31, this causes trigger 34 to produce an output on a conductor 36 as shown in FIG. 2*h*, which is supplied as a control input to a gate 37 which controls a slave phase register 38. Slave register 38 includes a pair of triggers 38*a*, 38*b*. Gate 37 receives in parallel the outputs from the A, B, C, D conductors of the phase generator 28, so that the four phase pulses from phase generator 28 are sequentially supplied through gate 37 to slave register 38 when the gap mark pulse appears on conductor 31. The triggers of slave register 38 thus lock in step with the clock phases supplied on conductors A, B, C and D after the gap mark appears on line 31 and prior to appearance of the reference mark pulse on conductor 32. Under these conditions, with slave register 38 locked in phase with the master phase generator 28, phase generator 38 supplies the four clock phase pulses represented by FIGS. 2*c*, 2*d*, 2*e* and 2*f* to the inputs of each of the associated ones of a plurality of clock phase AND gates 39*a*, 39*b*, 39*c*, 39*d*.

The other input to each of these clock phase AND gates is supplied from the associated ones of the output conductors of phase generator 28, so that these different clock phase AND gates 39 are opened once per bit time upon occurrence of the associated clock phase pulse after the gap mark occurs. The outputs of clock phase AND gates 39a–39d are supplied in common as one input to a clock selection AND gate 41. The other input to AND gate 41 is supplied from the output of trigger 34.

The reference mark pulse appearing on conductor 32 when the trailing edge of the reference mark passes under the data read head is supplied through a delay network 42 which delays this pulse by an amount corresponding to one eighth of a bit period. This delayed reference mark pulse is then supplied as the other input to trigger 34. The delayed reference mark pulse resets trigger 34 one eighth of a bit period after the trailing edge of the reference mark occurs, as shown in FIG. 2b, and this resetting sends through conductor 36 a pulse to close gate 37 and thus disconnect the slave register 38 from the master phase generator 28. This disconnection of slave register 38 from the phase generator 28 stops the slave register 38 in the condition which was "current" at the time of the reference mark, i.e. at that clock phase which most closely matches in time the occurrence of the reference mark. Generator 28 continues to generate all four clock phases and supply them to the four AND gates 39a through 39d. However, only one of these gates will be locked open by slave register 38, and this AND gate will be the one which was open at the time of disconnection of slave register 38 from phase generator 28. This AND gate will correspond to the selected clock phase. Thus, in the example illustrated in FIG. 2 AND gate 39b is locked open by slave register 38 and clock phase B is selected, since this clock phase is the first to occur after the reference mark occurred.

The phase B clock train from phase generator 28 thus passes through AND gate 39b and is supplied as one input to AND gate 41. AND gate 41 receives another input over a conductor 43 from the output of trigger 34, so that when trigger 34 is reset by the reference mark pulse from conductor 32 and delay 42, conductor 43 drops to supply a second input to AND gate 41 and open this gate. The selected phase B clock pulses are then passed through AND gate 41 and supplied, as shown in FIG. 2m, to bit ring 18 and to the inputs of each of the different bit AND gate 17a–17h for clocking the data as described above.

The operation then proceeds to either read data from the record, or to write data on this record, with the selected clock phase (in the illustrated example, phase B) being utilized as the clock pulse train to control the timing of the flow of data to or from the file. This clocking continues through the different bits of the different characters making up the record until the end of the record is reached. At the end of the record a new gap occurs preceding the next record and this gap is operative through the gap sensing device and gap sensor conductor 31 to start the clock phase selection cycle again. Slave register 38 is again locked in phase with phase generator 28 upon occurrence of the new gap mark, and the occurrence of the new reference mark then disconnects slave register 38 from phase generator 28 to cause register 28 to supply to bit ring 18 the clock phase which was nearest in time to the reference mark. By thus rephasing the clock for each record, maximum accuracy in clocking the data to and from the file is achieved, since the clock is brought into synchronism with the data at frequent intervals to prevent any substantial gap between the clock bits and the data bits. It will be understood that although the apparatus of FIG. 1 is operative to reselect a clock phase for each record, this does not necessarily mean that a different clock phase will be selected for each record. It is quite possible that the same clock phase will be selected for a number of consecutive records before any selection of a new clock phase is required.

FIG. 3 illustrates an alternative embodiment of the invention employing somewhat different techniques for rephasing and re-selecting the clock during the rotation of a magnetic disk storage file. In FIG. 3, the disk file again includes a plurality of data disks 11a and a clock disk 11c having a clock track thereon represented by clock pulses 11f. In the embodiment of FIG. 3, each magnetic recording surface of data disks 11a is provided with its own individual transducer 11, so that each transducer 11h cooperates only with one recording surface. Preferably, the data transducers 11h are ganged for common movement radially of data disks 11a, as indicated by the dotted connections between these transducers, and means (not shown) are provided to selectively position the data transducer array to any desired track position on the disks. The selection of a desired one of the data transducers 11h to perform the desired read or write operation is accomplished through means indicated schematically as a head selection matrix 51, which as is well known in the art, is utilized to select one of a plurality of data transducers 11h for either reading or writing. A further distinction between the two embodiments is that in the embodiment of FIG. 3, it is assumed that the clock is to be rephased every character, rather than every record as in the embodiment of FIG. 1.

To accomplish this reselection or rephasing every character, the clock pulses 11f are detected by transducer 11g and supplied, as before, through clock read amplifier 26 and filter 27 to phase generator 28 including the two triggers 28a, 28b. The output from phase generator 28, as before, comprises four output pulse trains, A, B, C and D, occurring within one bit period, with each train shifted 90° from its adjacent pulse train. These four clock phase pulse trains are supplied as inputs to a clock phase selection network 52 (shown in detail in FIG. 5) which is operative to select one of the four clock phase pulse trains supplied as inputs thereto and transmit this selected clock phase over a conductor 53 to the input of bit ring 18 and to the inputs of the bit ring AND gates 17a through 17h. As in the embodiment of FIG. 1, the bit ring AND gates 17a–17h all receive one common input from the selected clock phase line 53 and another common input from the data read amplifier over a conductor 54. Each of the AND gates also receives an individual input from its associated output conductor of bit ring 18. The data clocked through bit ring AND gates 17a–17h is again loaded serially into character register 21 and supplied to the using system over conductor 22.

In the embodiment of FIG. 3, instead of using an additional reference mark as was utilized in the embodiment of FIG. 1, the space bit at the beginning of each character is utilized as a reference mark to control the reselection of the clock phase. Since the space bit as always present in every character, it is in effect a reference mark in itself and may be utilized as a suitable mark with which to control the clock reselection process. To accomplish the reselection, the signal picked up by the selected reading head is supplied through head selection matrix 51 to a data read amplifier 56. Amplifier 56, which is under control of a read-write control device indicated schematically at 57, supplies output pulses in parallel to conductor 54 and to a read data converter device 61 which supplies pulses corresponding to the read data pulses to one input of an AND gate 62.

The other output to AND gate 62 is supplied from a read gate device 69. As is well known in the art, read gate 69 is opened under the control of read-write control device 57 when a reading operation is to begin and is closed by read-write control device 57 when the read operation is to terminate. Thus, read gate 69 produces an output of a predetermined type during a reading operation and changes its output when the reading operation is to terminate. The output of AND gate 62 is supplied as one input to a latching trigger 68. When signals are present at both inputs to gate 62, the output thereof latches trigger 68 in one condition until it is unlatched by a pulse received from the output of the $B_r$ AND gate 17h over a conductor 70.

The operation of the portion of the apparatus in FIG.

3 described thus far will be best apparent from the timing diagrams of FIG. 4. FIG. 4*a* again represents the clock track on clock disc 11*c*, with a frequency double the bit frequency. Curve 4*b* indicates the spacing of the bits in a character utilizing the same code as utilized in the embodiment of FIG. 1. It will be noted in this code that there is no information gap or reference mark preceding the start of the bits of the first character of a record as in the embodiment of FIG. 1, although it will be understood that the beginning of a record in the embodiment of FIG. 3 may be preceded by an address portion which identifies the following record. Curve 4*c* indicates graphically the output of read gate 69, showing its output rising prior to the first bit in the character and remaining up through the read operation.

Assume that a reading operation is to start with the bits represented in FIG. 4*b*. Under these circumstances, read-write control device 57 supplies a pulse to open read gate 69 prior to the first bit $B_s$ in curve 4*b*, as indicated in FIG. 4*c*. Opening of read gate 69 supplies a continuous signal to gate 62. Thus, when the first space bit $B_s$ occurs, a pulse corresponding to this bit is supplied through the read data converter 61 to the other input of gate 62. Gate 62 supplies a pulse to latch trigger 68 at this time, as shown in FIG. 4*d*, to supply an output signal to the clock phase select network 52 over a conductor 80. As will be explained in detail below, this pulse from latch 68 selects one of the four clock phases in clock phase select network 52 and supplies the selected clock phase over conductor 53 to bit ring 18 and the bit AND gates 17*a*–17*h* to control the clocking of the data bits, as described above.

Latching trigger 68 remains in the "up" condition through the rest of the bits in the character until the $B_r$ output from the bit ring occurs. When the redundancy bit $B_r$ occurs in the character, AND gate 17*h* produces an output which is supplied both to character register 21 and to a conductor 70 which forms an input for latching trigger 68. The appearance of this $B_r$ output pulse on conductor 70 unlatches trigger 68 so that the output conductor 80 from trigger 68 to clock phase select network 52 drops at this time, as shown in FIG. 4*d*. Dropping of the output line from latch trigger 68 de-energizes clock phase select network 52, as will be described more in detail below, to prepare clock select network 52 for reselection of a new clock phase with the next character.

When the space bit $B_s$ occurs in the second character in the record, as shown in FIG. 4*b*, a read pulse corresponding to this space bit is supplied through head selection matrix 51, data read amplifier 56 and read data converter device 61 to AND gate 62. Since AND gate 62 is receiving a signal from read gate 69 at this time, AND gate 62 is actuated to again supply a latching pulse to latching trigger 68. This raises the potential of output conductor 80 to supply a new clock phase select pulse to clock select network 52, as shown in FIG. 4*e*.

Thus, at the start of reading a given record after the read gate 69 is open, the first space bit $B_s$ latches trigger 68 to supply a first clock phase selection pulse to network 52 to select an appropriate clock phase for the bits in the first character in the record. At the end of the first character, the redundancy bit $B_r$ causes trigger 68 to unlatch to prepare clock select network 52 for a new selection operation for the second character in the record. For the second character after the start of a read operation, the space bit pulse from the read data converter 61 is again operative to latch trigger 68 and supply a pulse to clock phase select network 52 to re-select a clock phase for the second character. Thus, a new clock phase is selected for each character in the record, the latching at the start of the character being controlled by the space bit $B_s$ and the unlatching being controlled by the redundancy bit $B_r$. The space bit is thus utilized as a reference point in each character to control the re-selection of a clock phase once per character time.

Referring to FIG. 5, there is illustrated one form of apparatus 52 suitable for controlling the selection of a new clock phase once each character time in response to the pulses supplied from trigger 68 over conductor 71. Clock phase select network 52 is indicated by the dotted line outline in FIG. 5 and includes input conductor 80 from trigger 68, as well as the four clock phase pulse trains appearing on conductors A, B, C and D. The signal on conductor 80 is supplied as one input to each of four negative OR gates 71, 81, 91 and 101. Prior to the leading edge of the clock select pulse appearing on conductor 80, the potential of line 80 is down and the in-phase output of each of the negative OR gates, as represented by the lower output lines, is also down. This lower output line from each of these negative OR gates is fed back to the lower input of a corresponding positive OR gate 72, 82, 92 and 102 respectively. Thus, the out-of-phase output of the positive OR gates 72, 82, 92 and 102, as represented by the upper output line of each of these blocks, is therefore up except during those times when the upper input line to these positive OR blocks is up. This latter condition will be true only when both inputs of the preceding positive AND gate are up. These positive AND gates 73, 83, 93 and 103 respectively, are connected so that the lower output conductor of each is connected to the upper input conductor of the associated positive OR gate. The upper input of the positive AND gate 73 in the top row is supplied from the out-of-phase or upper output terminal of the positive OR gate 92 of the third row. Similarly, the upper input of the positive AND gate 93 in the third row is connected to the out-of-phase or upper output of the positive OR gate 72 in the top row. These same interconnections between the top and third rows are duplicated between the elements 82, 83, 102, 103 of the second and fourth rows. The other input to each of the positive AND gates 73, 83, 93, 103 is supplied from the associated one of the clock phase conductors A, B, C, D as indicated in the drawing.

Therefore, the upper input to the positive AND block 73 of the top row will be up except during a phase C clock pulse. Consequently, all of the clock pulses will pass through the positive AND blocks and into the upper inputs to the positive OR blocks. Before the potential of conductor 80 rises, these clock pulses will appear on the lower or in-phase output of each of the positive OR blocks 72, 82, 92, 102, but they will have no effect on the negative OR block in-phase outputs since these are already held down by the low level of the potential of conductor 80. Also during this period, the upper or out-of-phase output of each of the negative OR blocks 71, 81, 91, 101 is up, thus preventing any pulses from passing through any of the four negative AND gates 74, 84, 94, 104.

Following the rise of the leading edge of the pulse on conductor 80 at the start of reading of a character, as indicated in FIG. 4*d*, showing the rise of latch trigger 68 when the first space bit is read, the upper inputs to all four negative OR gates 71, 81, 91, 101 are up. This will have no effect on the negative OR gate outputs but will condition them so that the next clock pulse of any phase which occurs after the leading edge of the select gate pulse on conductor 80 will pass through its associated positive AND gate into the upper input of the associated positive OR block and will appear as a positive going pulse at the in-phase output of this positive OR block. Its effect on the negative OR block will be a shift in the in-phase output from down to up, since both inputs are now up, and this in turn is fed back to the positive OR block, causing a latching action to take place, whereby the two OR circuits in this row will remain in this new condition indefinitely or until the end of the clock select gating pulse.

Assume, for example, that the clock pulse immediately after the leading edge of the clock select gating pulse on conductor 80 is a phase C clock pulse. Under these circumstances, the two OR circuits 91 and 92 in the third row will be latched as described above. The out-of-phase output of the third row negative OR block 91 in the latched condition will be down, while the negative AND block 94 to which this negative OR block is connected will now emit pulses of phase D onto the output conductor 95 connected to this negative AND gate. The first phase D clock pulse to occur following the latching will also, in passing through its positive AND gate 103, cause the two OR gates 101, 102 in the fourth row to latch. The latched condition of the OR gates 91, 92, 101, 102 in the third and fourth rows will cause the out-of-phase outputs of the two positive OR gates 92 and 102 in these rows to drop to their lower level, thus preventing clock pulses of phases A or B from passing through the positive AND gates 73, 83 in the first and second rows. This, in turn, will prevent the OR gates in the first and second rows from latching and thereby prevent the negative AND gates 74 and 84 of the first and second rows from passing clock pulses to their associated output lines 75 and 85. There is likewise no output on line 105 from negative AND gate 104, since the lower input to negative AND gate 104 is connected back to the output of the positive AND gate 73 in the final row and this latter AND gate cannot pass any pulses.

The circuit thus operates to select a clock phase which is one phase beyond that phase which first appears after the leading edge of the select gate pulse on conductor 80. The four output lines 75, 85, 95, 105 of negative AND gates 74, 84, 94, 104 are connected to the four inputs of an OR circuit 110. The output of this OR circuit 110 is supplied to conductor 53 representing the selected clock phase. Thus a newly selected clock phase pulse train is supplied for each succeeding character in a record, although as in the embodiment of FIG. 1, the newly selected clock phase may be the same as the preceding selection.

While the invention has been particularly shown and described with reference to preferred embodiments thereof, it will be understood by those skilled in the art that the foregoing and other changes in the form and details may be made therein without departing from the spirit and scope of the invention.

What is claimed is:

1. Apparatus for controlling the flow of data relative to a cyclically moving recording medium on which said data may be recorded and from which said recorded data may be reproduced, said data being in the form of binary bits having a predetermined period and frequency and arranged in different combinations to represent different alpha-numeric characters, comprising a source of master clock pulses said master clock pulses having a frequency at least equal to the frequency of said bits, means for deriving from said master clock pulse a plurality of auxiliary clock pulse trains, each of said auxiliary clock pulse trains having the same frequency as said bit frequency and being shifted in time relative to each other by equal amounts within one of said bit periods, means for selecting one of said auxiliary clock pulse trains for controlling the clocking of data relative to said medium, and means for repeatedly re-selecting one of said auxiliary clock pulse trains at intervals during operation of said medium.

2. Apparatus for controlling the flow of data relative to a cyclically moving recording medium on which said data may be recorded and from which said recorded data may be reproduced, said data being in the form of binary bits having a predetermined period and frequency and arranged in different combinations to represent different alpha-numeric characters, comprising a source of master clock pulses synchronized with movement of said recording medium, said master clock pulses having a frequency at least equal to the frequency of said bits, means for deriving from said master clock pulses a plurality of auxiliary clock pulse trains, each of said auxiliary clock pulse trains having the same frequency as said bit frequency and being shifted in time relative to each other by equal amounts within one of said bit periods, means for selecting one of said auxiliary clock pulse trains for controlling the clocking of data relative to said medium, and means for repeatedly re-selecting one of said auxiliary clock pulse trains at intervals during operation of said medium.

3. Apparatus for controlling the flow of data relative to a cyclically moving recording medium on which said data may be recorded and from which said recorded data may be reproduced, said data being in the form of binary bits having a predetermined period and frequency and arranged in different combinations to represent different alpha-numeric characters, comprising a source of master clock pulses synchronized with movement of said recording medium, said master clock pulses having a frequency at least equal to the frequency of said bits, means for deriving from said master clock pulses a plurality of auxiliary clock pulse trains, each of said auxiliary clock pulse trains having the same frequency as said bit frequency and being shifted in time relative to each other by equal amounts within one of said bit periods, means for selecting one of said auxiliary clock pulse trains on the basis of its proximity in time to one of said bits for controlling the clocking of data relative to said medium, and means for repeatedly re-selecting one of said auxiliary clock pulse trains at intervals during operation of said medium.

4. Apparatus for controlling the flow of data relative to a cyclically moving recording medium on which said data may be recorded and from which said recorded data may be reproduced, said data being in the form of binary bits having a predetermined period and frequency and arranged in different combinations to represent different alpha-numeric characters, comprising a source of master clock pulses, said master clock pulses having a frequency at least equal to the frequency of said bits, means for deriving from said master clock pulses a plurality of auxiliary clock pulse trains, each of said auxiliary clock pulse trains having the same frequency as said bit frequency and being shifted in time relative to each other by equal amounts within one of said bit periods, means for selecting one of said auxiliary clock pulse trains on the basis of its proximity in time to one of said bits for controlling the clocking of data relative to said medium, and means for repeatedly re-selecting one of said auxiliary clock pulse trains at intervals during operation of said medium.

5. Apparatus for controlling the flow of data relative to a cyclically moving recording medium on which said data may be recorded and from which said recorded data may be reproduced, said data being in the form of binary bits having a predetermined period and frequency and arranged in different combinations to represent different alpha-numeric characters, comprising a source of master clock pulses synchronized with movement of said recording medium, said master clock pulses having a frequency at least equal to the frequency of said bits, means for deriving from said master clock pulses a plurality of auxiliary clock pulse trains, each of said auxiliary clock pulse trains having the same frequency as said bit frequency and being shifted in time relative to each other by equal amounts within one of said bit periods, means for utilizing the first one of said bits in one of said characters for selecting the one of said auxiliary clock pulse trains closest in time to said first bit for controlling the clocking of data relative to said medium, and means for repeatedly reselecting one of said auxiliary clock pulse trains at intervals during operation of said medium.

6. Apparatus for controlling the flow of data relative to a cyclically moving recording medium on which said data may be recorded and from which said recorded data may be reproduced, said data being in the form of binary bits having a predetermined period and frequency and arranged in different combinations to represent different alpha-numeric characters, comprising a source of master clock pulses synchronized with movement of said recording medium, said master clock pulses having a frequency at least equal to the frequency of said bits, means for deriving from said master clock pulses a plurality of auxiliary clock pulse trains having the same frequency as said bit frequency and being shifted in time relative to each other by equal amounts within one of said bit periods, gating means responsive to the first one of said bits in each of said characters for selecting the one of said auxiliary clock pulse trains which is closest in time to said first bit for controlling the clocking of said bits relative to said medium during said character, and gating means responsive to the last one of said bits in each of said characters for releasing said selected one of said auxiliary clock pulse trains.

7. Apparatus for controlling the flow of data relative to a cyclically moving recording medium on which said data may be recorded and from which said recorded data may be reproduced, said data being in the form of binary bits having a predetermined period and frequency and arranged in different combinations to represent different alpha-numeric characters, comprising a source of master clock pulses, said master clock pulses having a frequency at least equal to the frequency of said bits, means for deriving from said master clock pluses a plurality of auxiliary clock pulse trains, each of said auxiliary clock pulse trains having the same frequency as said bit frequency and being shifted in time relative to each other by equal amounts within one of said bit periods, gating means responsive to the first one of said bits in each of said characters for selecting the one of said auxiliary clock pulse trains which is closest in time to said first bit for controlling the clocking of said data relatve to said medium during said character, and gating means responsive to the last one of said bits in each of said characters for releasing said selected one of said auxiliary clock pulse trains.

8. Apparatus for controlling the flow of data relative to a cyclically moving recording medium on which said data may be recorded and from which said recorded data may be reproduced, said data being in the form of binary bits having a predetermined period and frequency and arranged in different combinations to represent different alpha-numeric characters, comprising a source of master clock pulses synchronized with movement of said recording medium, said master clock pulses having a frequency at least equal to the frequency of said bits, means for deriving from said master clock pulses a plurality of auxiliary clock pulse trains, each of said auxiliary clock pulse trains having the same frequency as said bit frequency and being shifted in time relative to each other by equal amounts within one of said bit periods, gating means responsive to the first one of said bits in one of said characters for selecting the one of said auxiliary clock pulse trains which is closest in time to said first bit for controlling the clocking of said bits relative to said medium, and gating means responsive to the last one of said bits in one of said characters for releasing said selected one of said auxiliary clock pulse trains.

9. Apparatus for controlling the flow of data relative to a cyclically moving recording medium on which said data may be recorded and from which said recorded data may be reproduced, said data being in the form of binary bits having a predetermined period and frequency and arranged in different combinations to represent different alpha-numeric characters, said characters being combined to form records, comprising a source of master clock pulses synchronized with movement of said recording medium, said master clock pulses having a frequency at least equal to the frequency of said bits, means for deriving from said master clock pulses a plurality of auxiliary clock pulse trains, each of said auxiliary clock pulse trains having the same frequency as said bit frequency and being shifted in time relative to each other by equal amounts within one of said bit periods, and gating means responsive to the first one of said bits in each of said records for selecting the one of said auxiliary clock pulse trains which is closest in time to said first bit for controlling the clocking of said data relative to said medium during said character.

References Cited by the Examiner

UNITED STATES PATENTS

| | | | |
|---|---|---|---|
| 2,807,003 | 9/57 | Alrich | 340—174.1 |
| 2,819,457 | 1/58 | Hamilton | 340—174.1 |
| 2,887,676 | 5/59 | Hamilton | 340—174.1 |
| 2,972,735 | 2/61 | Fuller | 340—174.1 |

IRVING L. SRAGOW, *Primary Examiner.*

UNITED STATES PATENT OFFICE
CERTIFICATE OF CORRECTION

Patent No. 3,195,118 July 13, 1965

Hal K. St. Clair

It is hereby certified that error appears in the above numbered patent requiring correction and that the said Letters Patent should read as corrected below.

Column 11, line 11, after "trains" insert -- , each of said auxiliary clock pulse trains --.

Signed and sealed this 8th day of February 1966.

(SEAL)
Attest:

ERNEST W. SWIDER
Attesting Officer

EDWARD J. BRENNER
Commissioner of Patents